(12) United States Patent
Bavli

(10) Patent No.: US 9,295,337 B1
(45) Date of Patent: Mar. 29, 2016

(54) PORTABLE TRAVEL MAT HAVING MULTIPLE CONFIGURATIONS FOR USE AS CUSHION AND/OR PILLOW

(71) Applicant: Guy Bavli, Davie, FL (US)

(72) Inventor: Guy Bavli, Davie, FL (US)

( * ) Notice: Subject to any disclaimer, the term of this patent is extended or adjusted under 35 U.S.C. 154(b) by 0 days.

(21) Appl. No.: 14/511,305

(22) Filed: Oct. 10, 2014

Related U.S. Application Data

(60) Provisional application No. 61/889,127, filed on Oct. 10, 2013.

(51) Int. Cl.
| | | |
|---|---|---|
| *A47C 27/00* | (2006.01) | |
| *A47C 31/00* | (2006.01) | |
| *A47G 9/10* | (2006.01) | |
| *B60N 2/60* | (2006.01) | |
| *B60N 2/48* | (2006.01) | |
| *B64D 11/00* | (2006.01) | |

(52) U.S. Cl.
CPC . *A47C 31/00* (2013.01); *A47G 9/10* (2013.01); *B60N 2/4879* (2013.01); *B60N 2/60* (2013.01); *B64D 11/00* (2013.01); *A47G 2009/1018* (2013.01)

(58) Field of Classification Search
CPC ........................................ A47C 27/00
USPC ................... 5/655.9, 657, 632, 640, 417–420
See application file for complete search history.

(56) References Cited

U.S. PATENT DOCUMENTS

| | | | |
|---|---|---|---|
| 4,370,767 A | | 2/1983 | Fraser |
| 4,459,714 A | | 7/1984 | Lin |
| 4,603,444 A | * | 8/1986 | Suits ................................ 5/657 |
| 5,066,001 A | | 11/1991 | Wilkinson |
| 5,297,304 A | | 3/1994 | O'Sullivan |
| 5,611,414 A | * | 3/1997 | Walker .............................. 190/2 |
| 5,920,933 A | | 7/1999 | Chou |
| 5,987,676 A | | 11/1999 | Littleford et al. |
| 6,135,635 A | | 10/2000 | Miller et al. |
| 6,802,092 B1 | | 10/2004 | Klein |

* cited by examiner

*Primary Examiner* — Fredrick Conley
(74) *Attorney, Agent, or Firm* — Malin Haley DiMaggio & Bowen, P.A.

(57) ABSTRACT

A portable mat that includes a pliable foam body having a rectangular shaped with a fabric cover. Said mat includes a plurality of fasteners disposed along each longitudinal side and tabs or other connectors that allow the first and second fasteners to be used for manually configuring the travel mat into a plurality of different individual configurations resulting in cushions, pillows, back rests at rests or lying down comfortable pillows for the user. Indicia in the form of numerals can be individually placed next to fasteners for guiding the user to establish the same previously formed configuration. The mat is lightweight for travel and can be rolled up and carried easily when traveling.

6 Claims, 14 Drawing Sheets

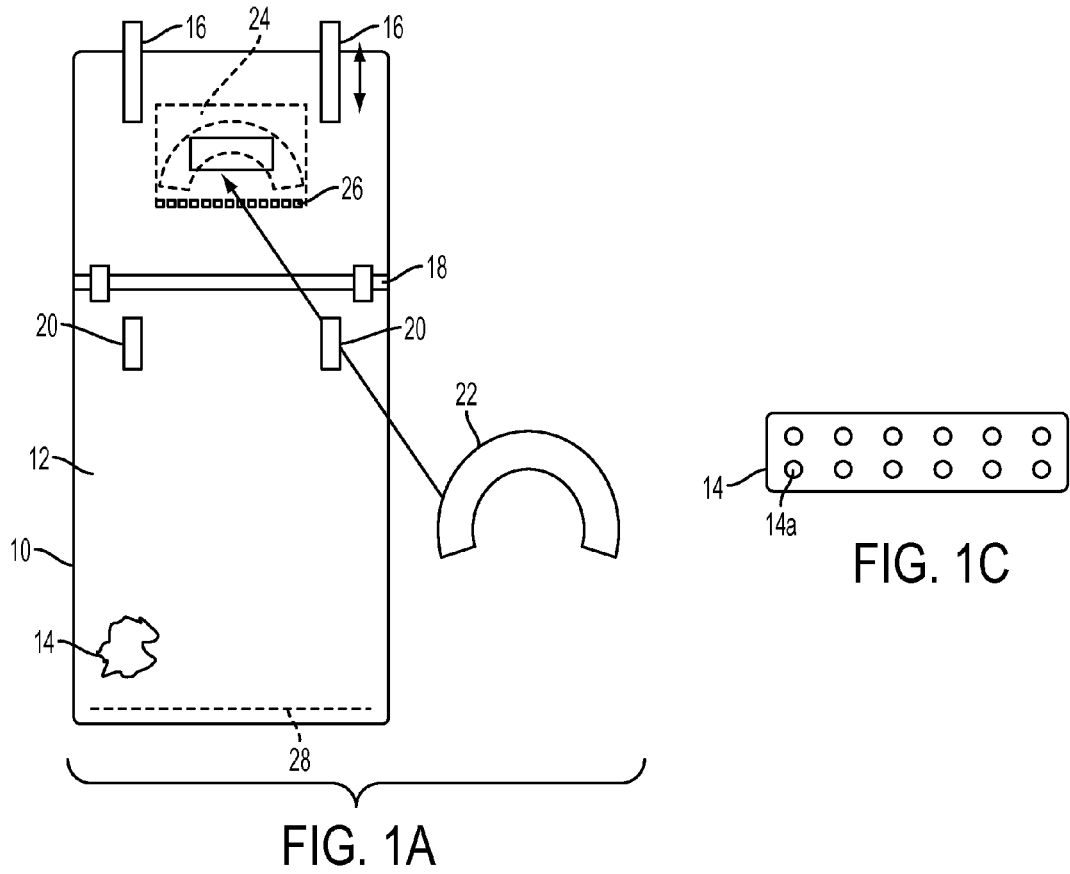
FIG. 1A
FIG. 1C
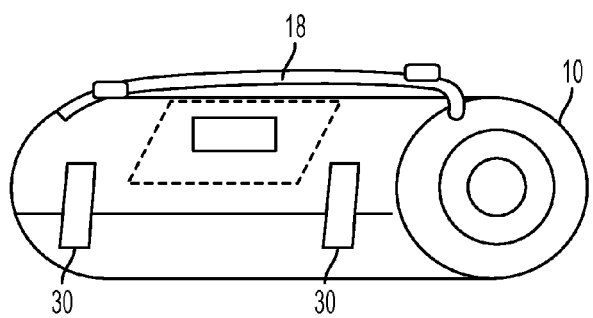
FIG. 1B
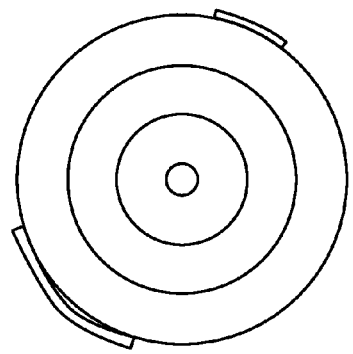
FIG. 1D

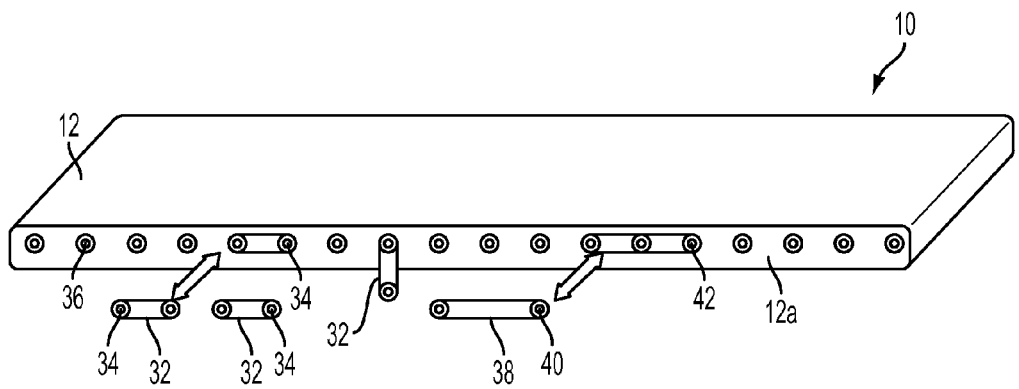
FIG. 2A
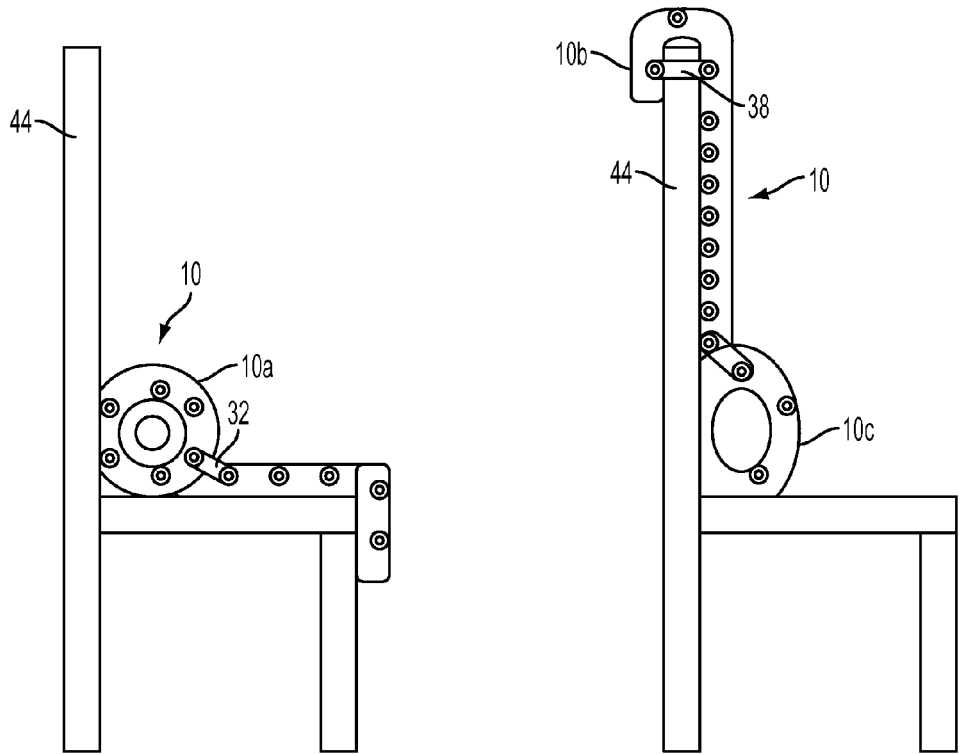
FIG. 2B
FIG. 2C

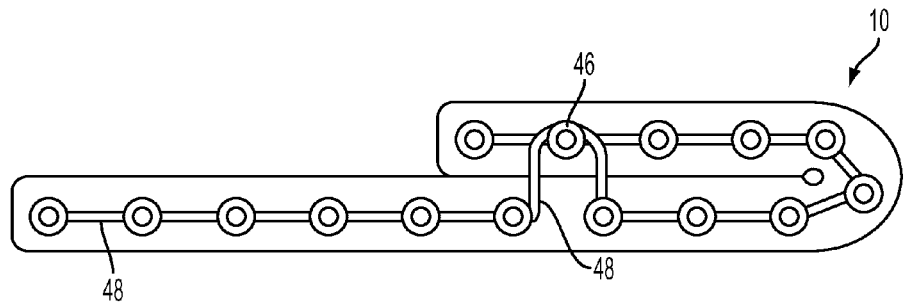
FIG. 3C
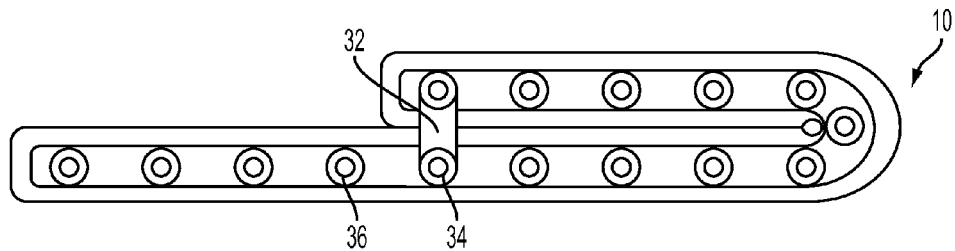
FIG. 3D
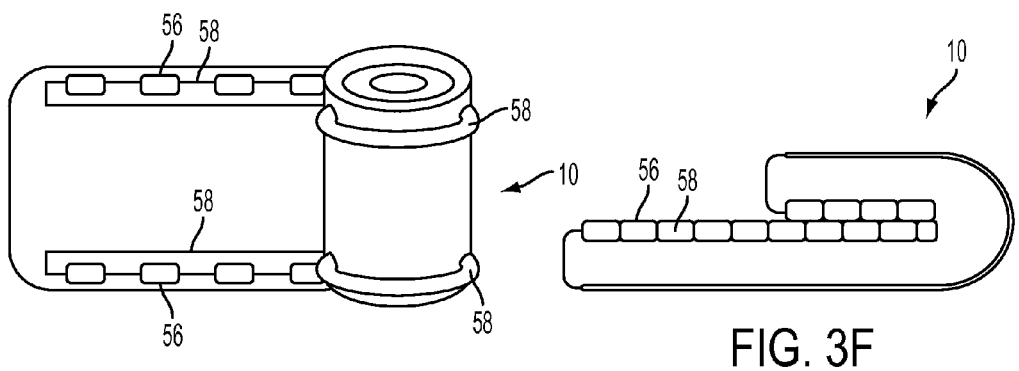
FIG. 3E
FIG. 3F

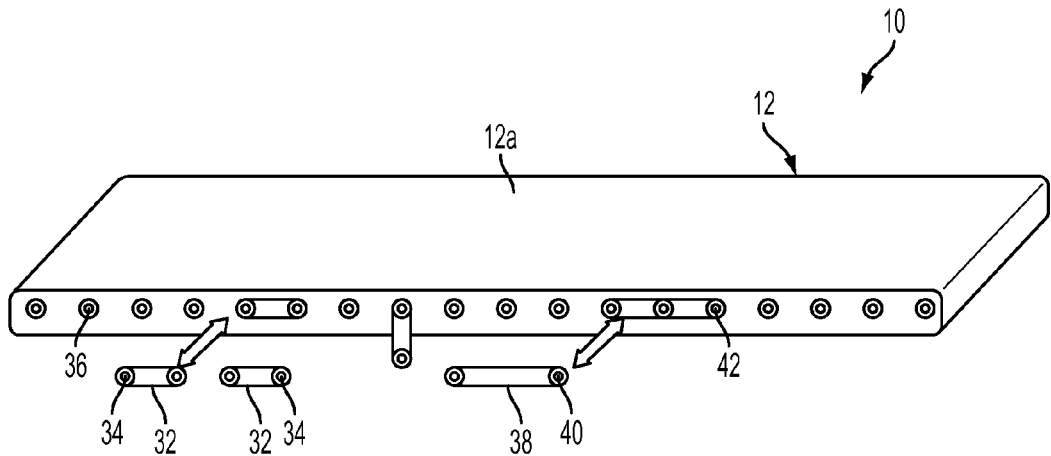
FIG. 5A
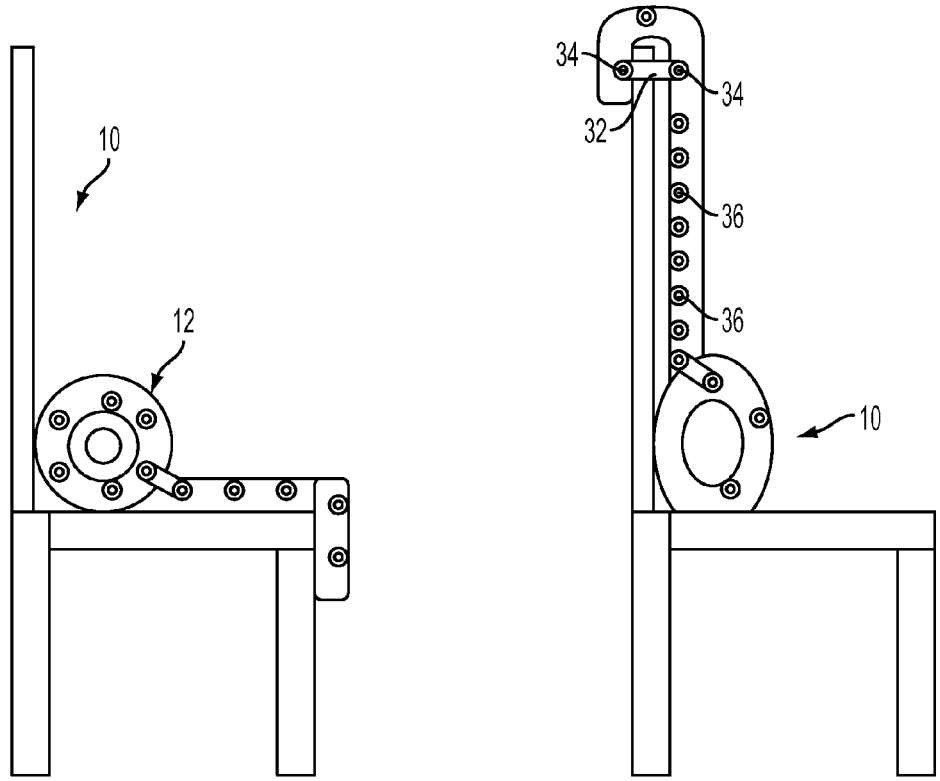
FIG. 5B
FIG. 5C

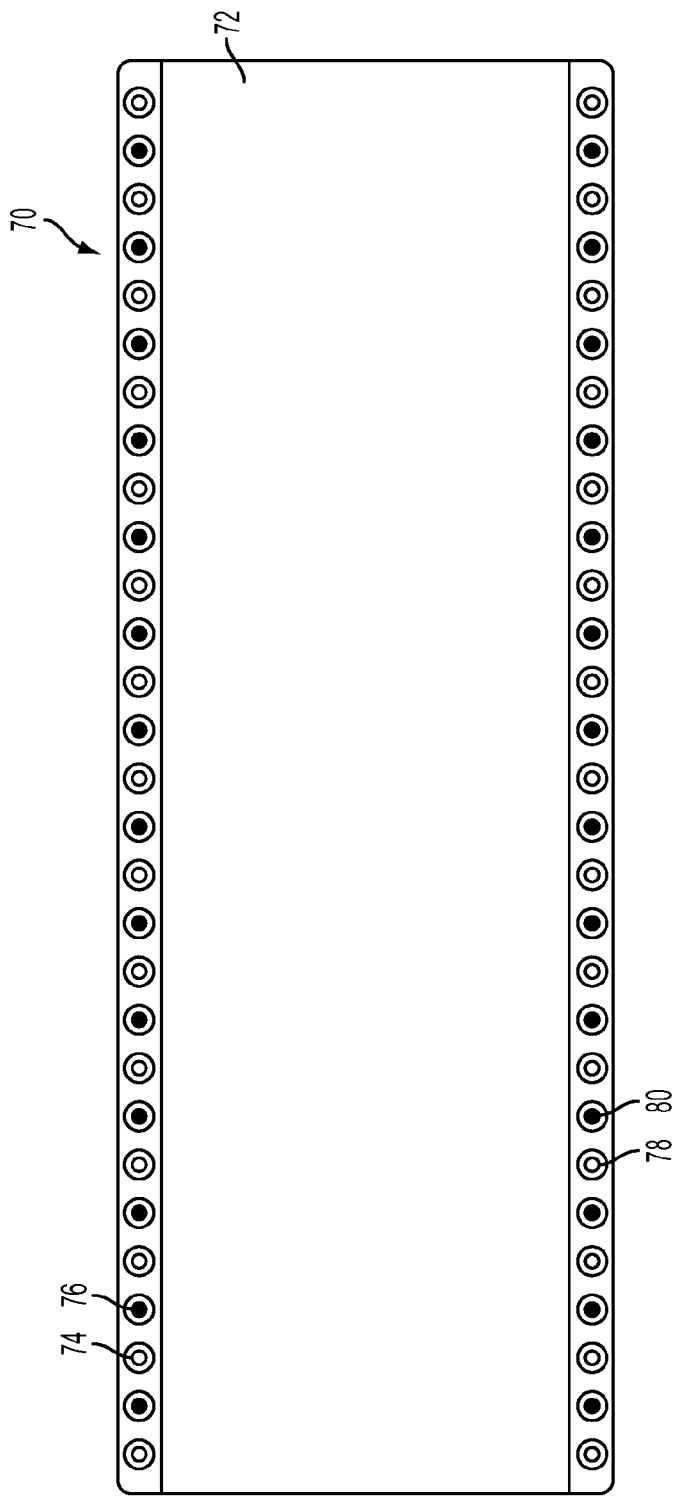
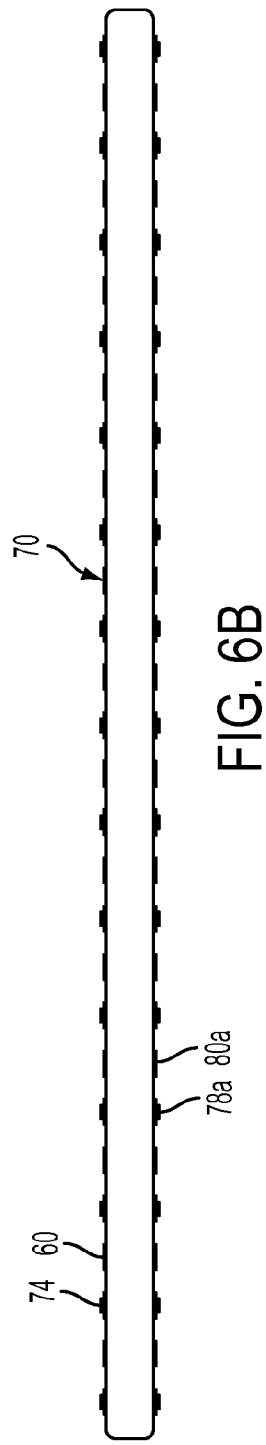

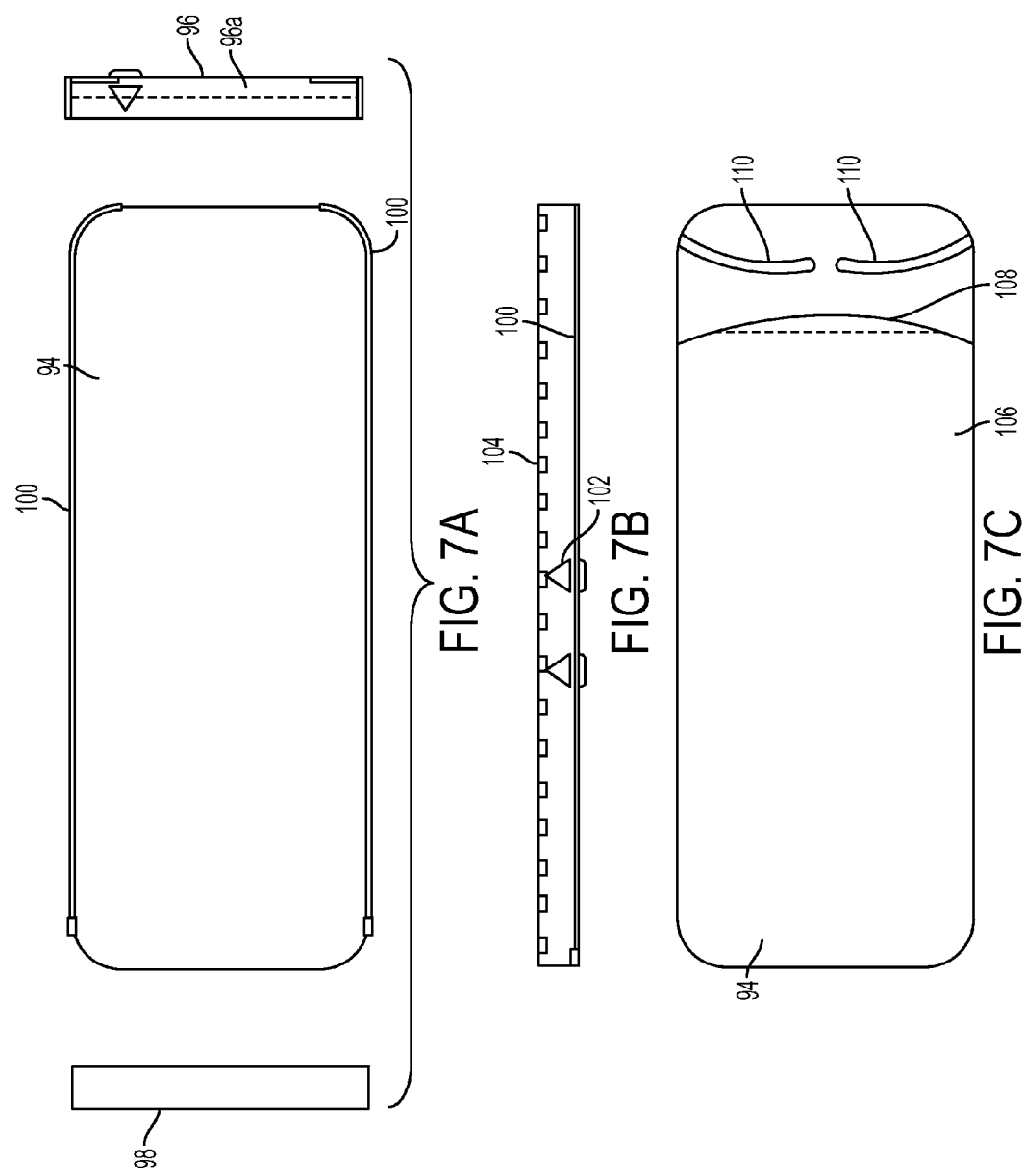

PORTABLE TRAVEL MAT HAVING MULTIPLE CONFIGURATIONS FOR USE AS CUSHION AND/OR PILLOW

CROSS REFERENCE TO RELATED APPLICATIONS

This application claims the benefit of provisional U.S. Patent Application No. 61/889,127, filed on Oct. 10, 2013.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

This invention relates to a portable mat that has multiple manually formed specific individual configurations held by fasteners for use as a cushion or pillow, especially when seated during travel, for enhancing comfort. The device can provide support in seating of any kind, including office, automobile, aircraft, trains, sofa and other seating venues. The device can be used as a yoga or exercise mat and also for supporting the back, neck or other body parts. The mat is useful for resting or sleeping.

2. Description of Related Art

Long-distance air travel today is commonplace throughout the world in this global economy and environment. Traveling for hours on an aircraft in a cramped small space is commonplace. Long rides on other means of transportation are also well-known including cars and buses and trains. Most of the seats available in public transportation and especially economy class provide such a cramped environment that it is almost impossible to get comfortable especially for long periods of time. Public transportation seats are often made to be durable and are not as soft or comfortable as the public would like them to be, especially for long travels. Individuals vary in comfort and orthopedic needs. The device described herein can be adjusted to support a plurality of individuals with special needs. The prior art describes numerous cushions and pillows which attempt to support the human body in various positions in chairs and recliners and flat surfaces. Oftentimes such devices can be cumbersome to carry when traveling and each device has only a single specific use.

The portable mat described herein provides a comfortable device that is easily transported during travel and that can provide multiple different configurations as a cushion or pillow or seat cover that makes a cramped seat environment specifically comfortable for multiple different body positions, comfort and support.

BRIEF SUMMARY OF THE INVENTION

A portable mat comprising a substantially rectangular foam (memory foam, latex or combination) body whose length greatly exceeds its thickness, a pliable fabric or cloth cover to enclose the foam body, and a plurality of male and female fasteners or connectors disposed along or adjacent the longitudinal sides of the mat body that permit specific manual engagement to manually configure the mat body into a specific shape. The mat can be rolled up and secured for maximum portability when not in use. The mat can be carried in a fitted bag. The cover of the mat can be easily removed for washing.

In a first configuration the mat can be folded back upon itself and attached at multiple positions along the longitudinal axis of the mat body at variable overlapped lengths. Each different configuration is especially useful when the mat is used with a chair or seat such as an airline seat. Different mat configurations can be used individually as a cushion or pillow for the neck area, for the person's back area as a back support, lower back, buttocks or for leg supports. The mat can also be a used full length in a chair for overall body comfort or lying down on a hard or soft surface. A pillow can be formed when lying to support both head and back as needed.

In a second configuration the mat can be overlapped on a chair back to firmly hold the mat in place relative to the seat, again for maximum comfort of the user.

Although there are a variety of different fasteners that can be used along the longitudinal sides, top and edges for achieving different mat configurations, one particular structural embodiment could include the use of cloth or fabric tabs which are short lengths of material of variable lengths, with each tab having a plurality of male and female fasteners disposed at opposite ends of the tab. The tabs can be attached to male or female fasteners permanently affixed to the mat cover along its longitudinal sides so that as the mat is folded over upon itself or rolled, the adjacent side areas containing male or female fasteners can be attached at opposite ends to a plurality of tabs which will firmly secure the sides of the mat in the desired configuration. The mat will stay this way according to the comfort chosen by the user.

In another embodiment the side panels on each mat can include an elastic cord threaded through a plurality of eyes anchored in the mat cover fabric with the elastic cord projecting out in a series of potential loops (if pulled). The side areas of the mat will also include a plurality of buttons sized in diameter and height to receive the elastic loop so that again the mat can be configured by overlapping one end, or parts of the mat to various different longitudinal positions on the map body, or rolling the mat and affixing a plurality of elastic cord loops to the corresponding adjacent buttons along the side firmly holding the mat in a desired configuration.

Examples of use of the travel mat would be in a seat or chair where a portion of the mat at one end is rolled up to serve as a back rest when seated in the chair with a portion of the mat extending along the seat and down the front side of the chair. The mat can also be looped over the back of the chair to hold that position and again looped in the middle as a back support. The mat can be folded upon itself to serve as a cushion for the back of the chair and the bottom of the chair when a person is seated. The mat can also be configured in a chair seat to include a head cushion along with being a back rest and a seat rest. The mat can be used as a double cushion to support the buttocks area, or can be folded or rolled to support the lower back. An adjustable position can be created to nearly endless possibilities according to the user's comfort and needs. The mat can be folded, rolled, squeezed together, and adjusted as to length and combinations thereof.

In summary the configurable mat shown herein can be used with any chair as a seating cushion, a back support mat, a pillow mat, head and back mat, a yoga mat, a sleeping mat, and a commercial aircraft seat support. It can also provide support and comfort when lying down on three or four seats on an airplane when no one is sitting next to the user.

It is an object of this invention to provide a portable mat that can be manually configured into different shapes for use as a cushion, pillow, or body support especially in chairs and seats.

It is another object of the invention provides a portable mat that can be rolled up into a small object and that is lightweight for ease of portability especially during travel while at the same time providing for a configurable device for use in supporting different portions of the body especially in a seat.

BRIEF DESCRIPTION OF THE SEVERAL VIEWS OF THE DRAWINGS

FIG. 1A is a top plan view of the portable mat used in the present invention. FIG. 1B shows a perspective view of the portable mat. FIG. 1C shows a schematic top plan view of the core of the mat. FIG. 1D shows a side elevational view of the mat in a rolled up configuration.

FIG. 2A shows a perspective view of the portable mat that includes snap/tab fasteners partially exploded. FIG. 2B shows a side elevational view of the mat in a particular configuration. FIG. 2C shows a side elevational view of the portable mat secured to a chair and in an alternate configuration.

FIG. 3C shows a side elevational view of the mat folded over upon itself with elastic cord stretched as a loop around a button. FIG. 3D shows a side elevational view of a mat folded over upon itself with snap male and female fasteners. FIG. 3E shows a perspective view of a mat using hook and pile fasteners. FIG. 3F shows a side elevational view of the mat in FIG. 3F folded over itself.

FIG. 5A shows a perspective view of a travel mat in yet another alternate embodiment of the invention. In this invention embodiment, the travel mat cover includes numerical indicia displayed adjacent the fasteners so that the user can remember and determine a desirable previous manual configuration using numbers with the fasteners. FIGS. 5B and 5C show examples of specific configurations in a side elevational view with the numbers displayed.

FIG. 6A shows a top plan view schematically of an alternate embodiment of the mat having longitudinal side strips with snaps on the top and bottom of the mat on each side, the snaps being alternating male and female fasteners. In this way, the fastening will happen on the surface of the mat being able to fold, roll or use the shape of accordion to fasten the mat to a MALE and FEMALE fasteners according to the comfortable possession of the user.

FIG. 6B shows a side elevational view schematically of the mat shown in FIG. 6A.

FIG. 7A shows a top plan view of a mat schematically of yet another alternate embodiment of the invention with the ends exploded having a different fastener longitudinally. In this fastener idea, the hook is sliding on the sides of the mat, while the hoop is along the side of the mat allowing to modify the position of the mat and slide the hook to its position and attach it to the hoop to keep its desired position. Same is from both sides.

FIG. 7B shows a side elevational view schematically of the mat shown in FIG. 7A.

FIG. 7 C shows a bottom plan view schematically of the embodiment shown in FIG. 7A.

PREFERRED EMBODIMENT OF THE INVENTION

Figure 3A:
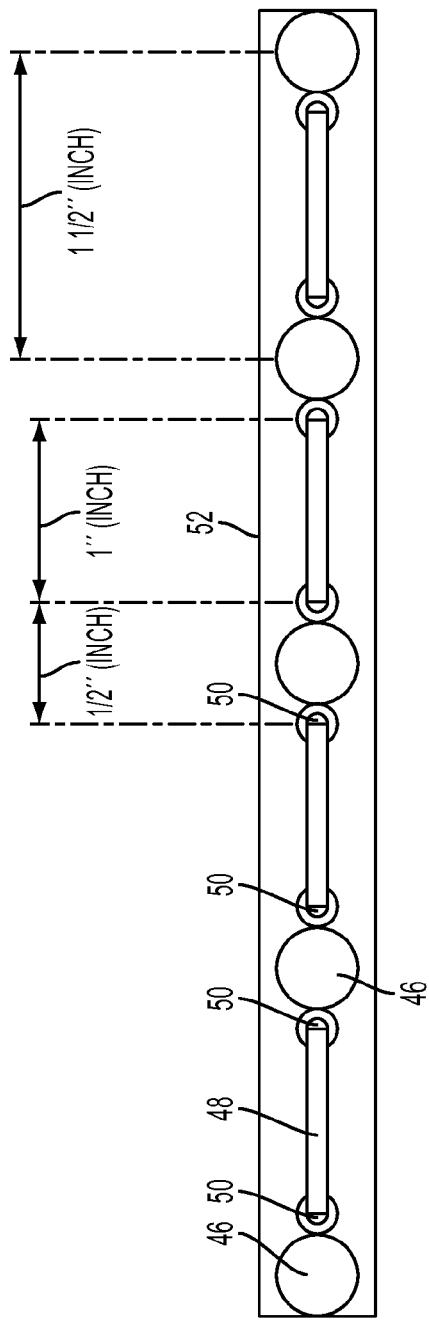
FIG. 3A shows a side elevational view of the mat using an alternate embodiment of fasteners that include an elastic cord and buttons.

FIG. 1A shows a top plan view of one embodiment of the mat 10 in accordance with the invention. The mat 10 is substantially rectangular and includes an outer cover 12 made of a resilient, artificial or synthetic or natural cloth or fabric. The mat body interior 14 is preferably made of foam which may include one or more layers of foam, including memory foam and latex or other known comfort foams. Cotton and wool materials can be used. The mat cover back or front may include parallel hook and pile (Velcro) straps which are used to roll up the mat in a portable configuration. The mat may also include a shoulder strap 18 can be extended from both sides. An inflatable pillow 22 can be inserted into a pocket 24 that includes a zipper 26 for storage. The bottom of the mat cover 12 includes a zipper 28 which allows the mat over 12 to be removed from the foam interior body 14 for wash.

FIG. 1B shows the mat 10 in a rolled up configuration so that the mat can be carried with a shoulder strap 18.

FIG. 1C shows a top plan view schematically representing the mat foam body 14 which makes up the body of the mat that includes apertures 14a or holes for an optional cooling technology. The mat body may be foam and supporters may be made from regular foam, memory foam, latex or synthetic wool to create maximum comfort.

FIG. 1D shows the entire mat rolled up. The memory foam mat body may be approximately one to one and a half inches thick in some embodiments that include memory foam in the amount of 75% in combination with regular foam 25% including holes for ventilation.

Referring now to FIG. 2A a preferred embodiment of the invention is shown with the mat 10 having a cover 12 and having one parallel longitudinal side 12a of the cover 12 that includes fastener tabs 32 which have male fasteners 34 that can be can be connected to female fasteners 36 on the mat cover 12 so that the mat 10 can be manually rolled or folded into numerous different configurations. The mat can be retained in a particular configuration by the use of fastener tabs 32 and their attachment at each end to different fasteners at different longitudinal locations on the sides 12a of the mat 10. The fastener tabs can be of different lengths such as tab 32 as compared to tab 38 which has a male fastener 40 on each end. Both parallel longitudinal sides of the mat left and right can include a plurality of female snap in fasteners 36 so that the tabs 32 and 38 can be connected on each longitudinal side of the mat 10 in a specific configuration and firmly held in place by a number of fastener tabs 32 and 38.

FIG. 2B shows an example of a mat 10 as it is disposed on a chair 44. One end of the mat 10 has been rolled up in area 10a and secured by a fastener tabs 32. There is sufficient length of the mat remaining to allow the mat end to extend over the front of chair 44.

FIG. 2C shows a different mat configuration. One end of the mat has been rolled up as shown in area 10c while the opposite end of the mat has been lapped over at 10b so that the mat end is held firmly to the top of chair 44 via fastener 38. In this configuration a portion of the rolled up mat 10c can serve as a back support while the rest of the mat is also supporting the back and lower back and held to the chair 44.

Figure 3B:
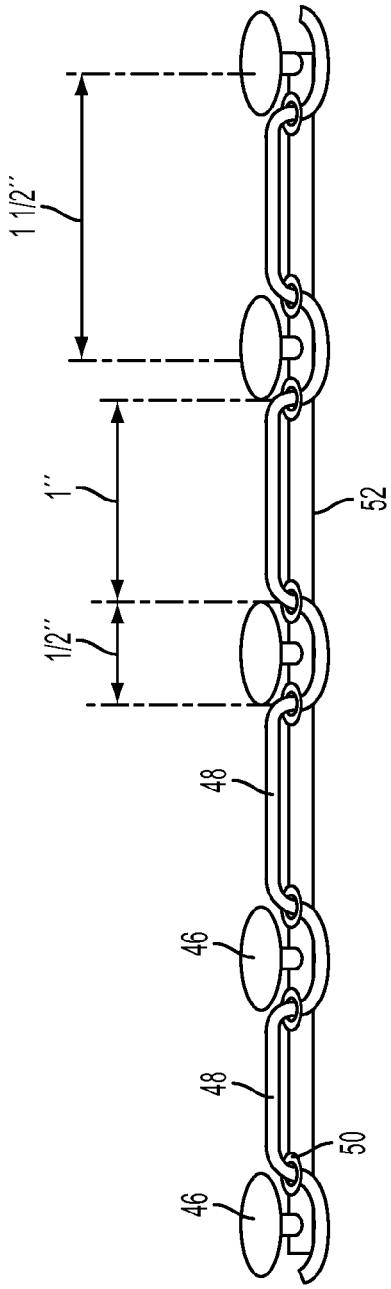
FIG. 3B shows a perspective view of the fasteners including the elastic band or cord shown in FIG. 3A.

Referring now to FIG. 3A and FIG. 3B, an alternate fastener system is described and shown that allows the mat to be configured manually in numerous different configurations wherein the size of the mat can be fastened to different portions or locations of the overlapped, rolled up mat wherein the mat can be used as a cushion or pillow or body support. In this alternate fastener embodiment the sides of the mat would include a plurality of raised buttons 46 linearly spaced longitudinally along each longitudinal side (left and right) of the mat connected to the mat cover 12a. Between each button 46 would be a pair of eyes (hole protector) 50 that receive an elastic cord 48. All of the fasteners 46 and the eyes 50 can be part of an elongated strip of fabric 52 that is attached to the longitudinal sides of the mat. The elastic cord 48 is threaded through each of the eyes 50 in such a way as to provide stretchable loops represented by the elastic cord 48 between each button 46 linearly in the longitudinal direction of the mat along each side. As shown in FIG. 3C the mat can be folded over upon itself and the elastic cord 48 stretched as a loop around a button 46 on each side to hold the one end of the mat 10 against itself because of the elastic cord 48 forming a loop around the button 46. This can be done in any configuration such as folding, rolling, or squeezing the mat together.

FIG. 3D shows a comparison of the fasteners 32 and snap male fasteners 34 that can connect to female fasteners 36 disposed along the longitudinal sides of mat 10 which is folded over and connected together similar to the configuration shown in FIG. 3C.

FIGS. 3E and 3F show yet another alternate fastener configuration in which hook and pile fasteners 56 and 58 are used (commonly sold under the trademark Velcro), or similar attachment, to again allow the mat 10 to be configured by folding it over itself along the top and bottom of the mat 10 by alternating hook and pile fasteners. There is a combination of a hook and pile fasteners along the sides 58a so in any combination of roll or fold, hook fasteners can engage pile fasteners for attachment to engage difference areas of the mat together.

Referring now to FIGS. 4A through 4G, the applicant's invention is shown in a series of different configurations manually established using the mat in conjunction with the tabs and fasteners along the sides of the mat to establish each individual comfort configuration. The different configurations shown in FIGS. 4A-G are utilized with a conventional chair which could also be an airline seat or a bus seat for a vehicle seat of any type for travel purposes. Obviously there are other configurations which can use when lying down to create pillows and cushions in conjunction with the mat and the user's comfort needs.

Figure 4A:
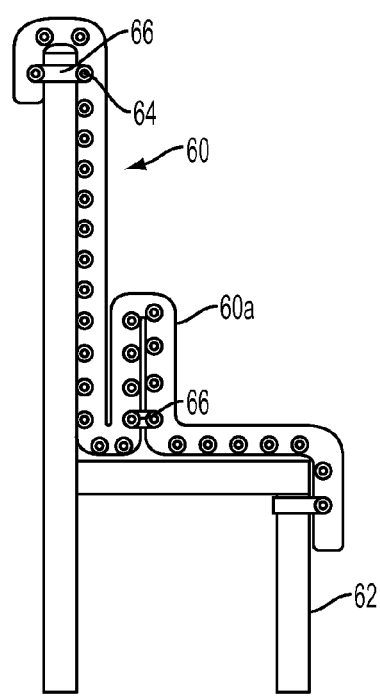
FIG. 4A shows a side elevational view of the portable mat attached to a chair in a first configuration.

FIG. 4A shows a mat 60 disposed over a chair 62 that covers the front of the chair back and the chair seat. One end of mat 60 is looped over the top of chair 62 by connecting a tab 66 at each end to fastener 64 on the side of mat. The purpose of this configuration is so that the mat 60 will not slide off the chair. Near the center of the mat 60a the mat has been doubled over to form a back cushion again using a tab 66 with the side fasteners. The opposite end of the mat can be secured to a chair leg.

Figure 4B:
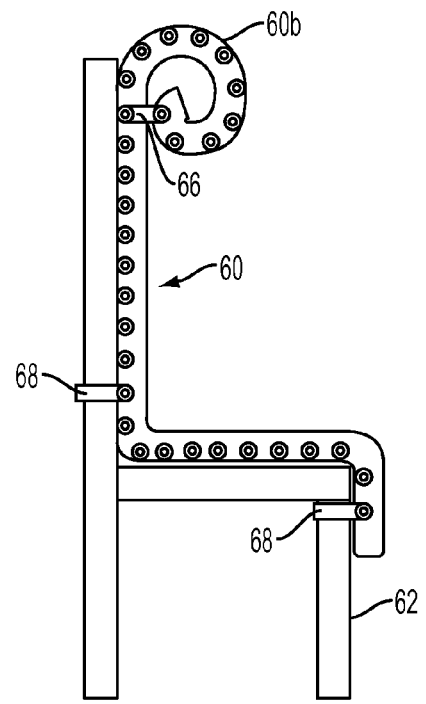
FIG. 4B shows a side elevational view of a portable mat in a second alternate configuration attached to a chair.

FIG. 4B shows an alternate configuration with the mat 60 having the one end portion near the top of chair 62 rolled up like a cushion that can be secured by tab 66 again with the side fasteners 64 resulting in a head cushion or neck cushion. The rest of the mat 60 is draped over the chair seat and the chair back again portions of the mat 60 can be attached to the chair back when the chair legs by loops or fastener 68.

Figure 4C:
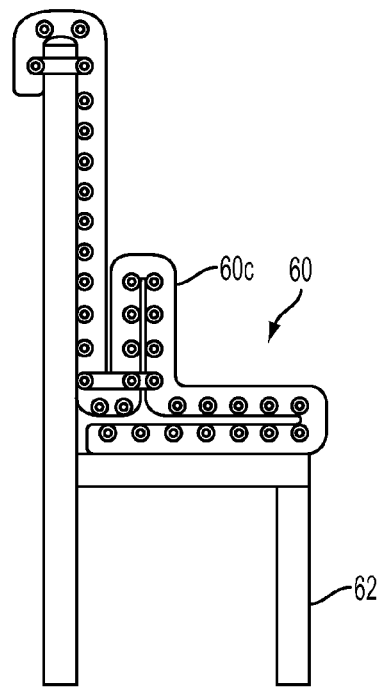
FIG. 4C shows a side elevational view of the travel mat attached to a chair in yet another configuration.

FIG. 4C shows an alternate configuration of the invention using mat 60 in conjunction with a chair 62. One end of the mat is folded back over itself in approximately a third to form a cushion on the chair 62 seat to make a double cushion for extra buttock's comfort or hard chairs portion with a rolled up or accordion (squeezed) portion in the back 60 C and with the rest of the mat 60 being attached to the top of the chair 62 to firmly hold the mat 60 to the chair 62.

Figure 4D:
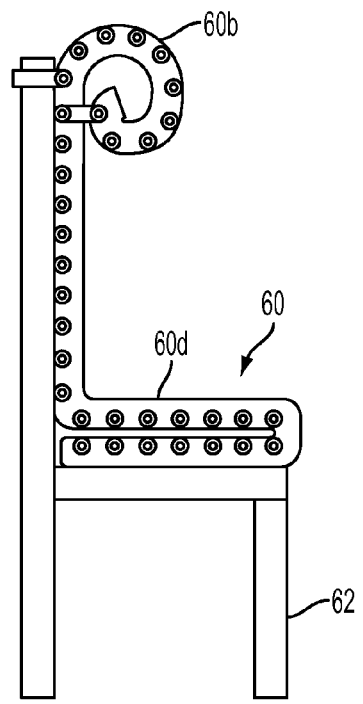
FIG. 4D shows the side elevational view of a travel mat used with the chair in yet another alternate embodiment configuration.

FIG. 4D shows yet another alternate configuration of mat 60 that includes one end of the mat being folded over upon itself to form a cushion 60 D for the chair seat and a head cushion 60 B or neck cushion mounted at the top of chair 62 at the chair back. Again the mat is fastened to the chair at the top so that the mat 60 will not slide off the chair when in use.

Figure 4E:
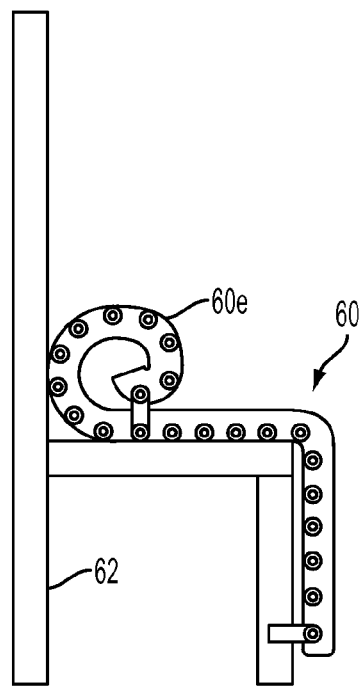
FIGS. 4E, 4F, and 4G show side elevational views of yet more additional configurations of the mat relative to a chair. Other mat configurations are possible using folding, rolling and length adjustments.

FIG. 4E shows yet another configuration in which one end of the mat is rolled up to form a back cushion 60 E that fits between the seat in the back of chair 62. The remaining portion the mat is draped over the chair seat in the front of the chair and may be secured at the end to the chair leg 62.

Figure 4F:
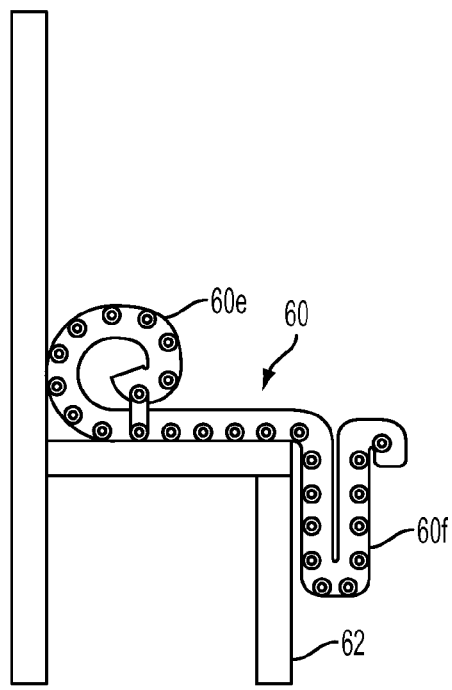

FIG. 4F shows a configuration similar to FIG. 4E with a back cushion rolled up portion of the mat 60 E but with a front overlapped 60 F that abuts the front face of chair 62 in an overlap fraction with one mat and overlapped over a portion of the mat 60.

Figure 4G:
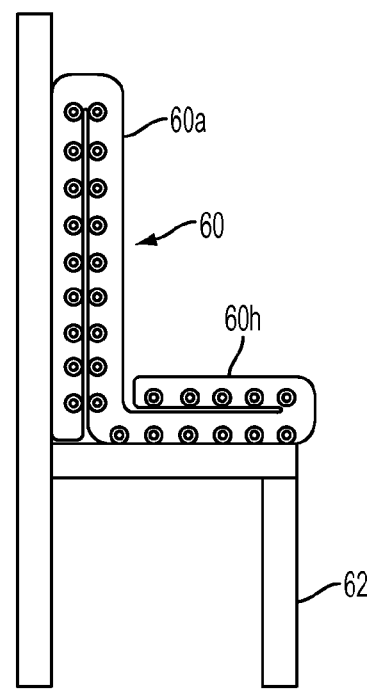

FIG. 4G shows a configuration in which the mat 60 is doubled over at each end upon itself to provide a back cushion 60g and a seat cushion 60h simultaneously.

FIGS. 5A, 5B and 5C show a travel mat that is an alternate embodiment that includes the use of numbers and numerical indicia that may or may not be consecutive to aid in selecting a specific configuration. In FIG. 5A the device 10 is shown including mat 12 having the cover 12a. Along one side or both sides of mat 12 and cover 12a fasteners 36 are provided to be used with tabs 32 that include fasteners 34 that can engage and be connected to fasteners 36 on mat cover 12a. In this embodiment adjacent each fastener 36 and 42 are sequential numerals beginning with the number 1 that represents the closest fastener. By using the additional numerals along each side of mat 12, the user can memorize a particular configuration based on where tabs 32 and longer tabs 38 are attached to which fasteners so that a user can uniformly configure the mat each time. For example FIG. 5B and FIG. 5C show different configurations in a chair that were achieved using numerals displayed on the mat 12. In FIG. 5B, a tab is connected between fasteners 12 and 5. In FIG. 5C, a tab 32 is connected between 1 and 4 over the top of the chair and between numerals 9 and 14 in a rolled up posture. The numerals would be displayed on each side of the mat adjacent a fastener.

Figure 6D:
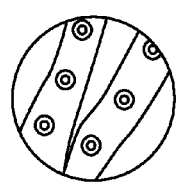
FIG. 6D shows an insert cutaway of a portion of the snap tape showing a few male and female snap fasteners side-by-side in perspective.
Figure 6E:
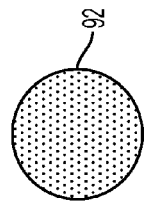
FIG. 6E shows an insert of a fabric pattern in a top plan view.
Figure 6C:
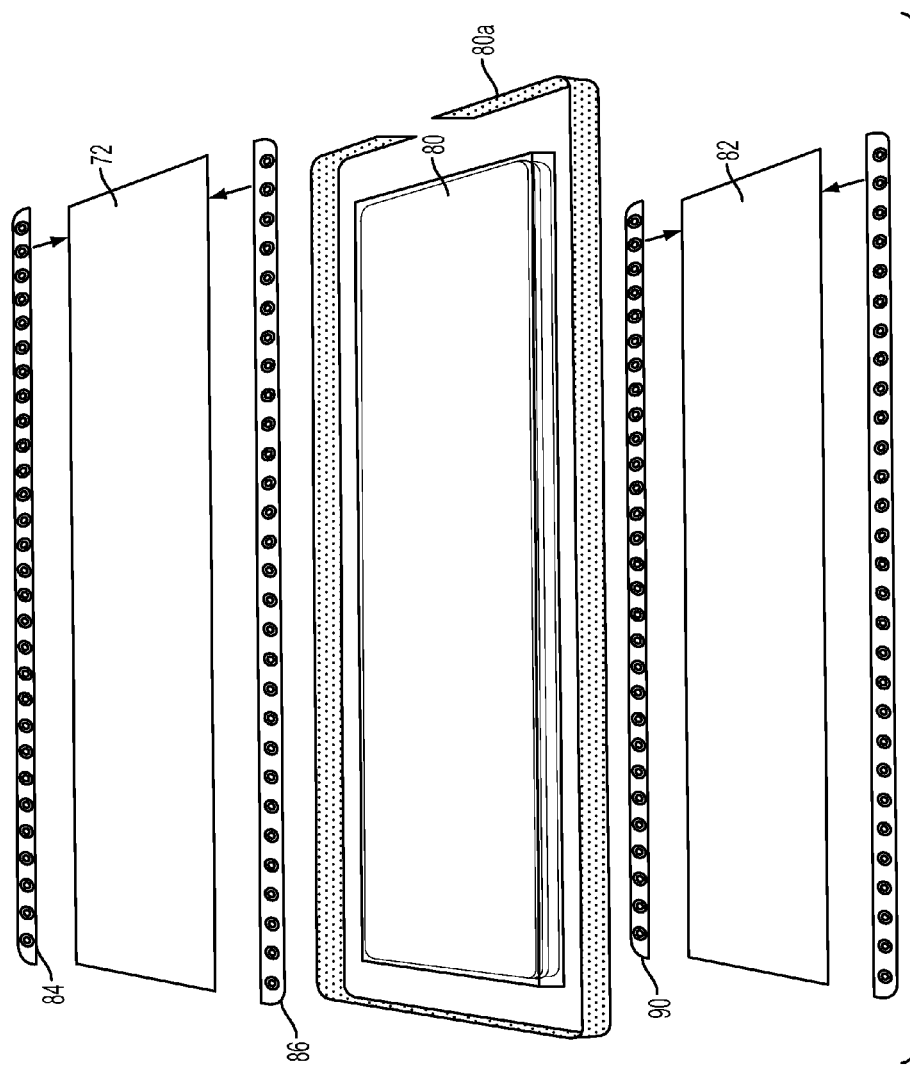
FIG. 6C shows an exploded view of the alternate embodiment schematically shown in FIG. 6A.

Referring now to FIG. 6A, another alternate embodiment of the invention is shown. The mat 70 includes a plurality of snap fasteners such as male fasteners 74 and female snap fasteners 76 attached along one longitudinal side of mat 70 on top and male snap fasteners 78 and female snap fastener 80 attached along the opposite longitudinal side on top. The snap fasteners may be mounted on fabric strips that can be sown directly onto the mat top longitudinal edge surface. In FIG. 6B, which is a side view, there are also rows and strips of longitudinal snaps on each side on the bottom of mat 70 shown as snap 78 and 80. Note that the snap fasteners male and female are alternated relative to each other so that every other one is a male fastener and every other one is a female fastener along each side on the top and the bottom of the mat. This configuration allows for convenient and rapid rolling up and folding over longitudinally of the mat in one direction or the other in order to achieve individual mat configurations starting with a small rolled up portion at one end or two segments longitudinally folded over once which can be snapped together. Mat can be rolled, folded or accordion fold, in each configuration, it would be possible to fasten it to stay in his position. The construction of the embodiment shown in FIG. 6A and FIG. 6B is shown in an exploded view in FIG. 6C. The body of the mat 80 which is foam with holes along its surface (to allow ventilation) a cover is attached around the foam to fit it nicely using a fabric sheet 72 on the top and a fabric sheet 82 on the bottom and a side fabric 80a that surrounds the foam body of the mat 80. The male and female snap fasteners can be attached with strips 84, 86, 88 and 90 which are fabric strips each containing alternating snap male and female fasteners which can be sown along the sides of the mat cover on the top and on the bottom. Snaps can also be attached to the cover by other means like pleasure snaps, snap strips or glued. FIG. 6D is an insert showing in detail a portion of the snap strips which include female and male fasteners. FIG. 6E represents the side fabric nylon or polyester element 92.

Figure 7D:
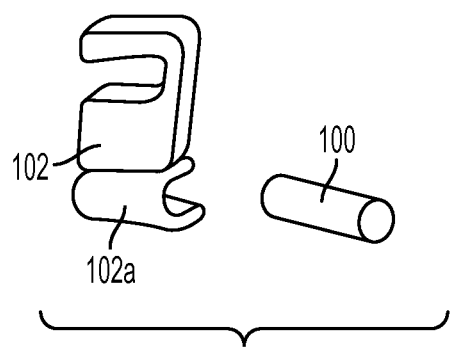
FIG. 7D shows an exploded view of the alternate embodiment fastener shown in FIG. 7B.
Figure 7E:
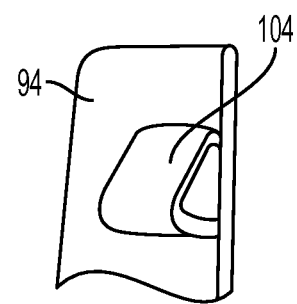
FIG. 7E shows a perspective view partially cutaway of a loop fastener used in the alternate embodiment shown in FIG. 7D.

Referring now to FIG. 7A, yet another alternate embodiment of the invention is shown schematically. The mat 94 is shown from a top view which has tracks 100 longitudinally disposed along the sides from end to end of the mat 94. The top end is also shown which is element 96 that may include a zipper 96a. The bottom end is shown as element 98. FIG. 7B shows a track 100 and a pair of fasteners 102 which can slide from end to end of the mat longitudinally along the track 100. In this embodiment the hooks 102 can be moved along the track 100 to any position desired which allows the hook 102 to be fastened to a loop 104 on the opposite side of the mat. The hook and loop can be also replaced with a snap for this example, in which the male snap will slide on its tracks which can be snapped into the female snaps along the sides. FIG. 7C shows the underside of mat 94 which may include a pocket lining and zipper 108 and carry on straps 110. The stretch flap turns inside out to the topside of the mat covering and containing a rolled mat. FIG. 7D shows a hook 102 and a track connector 102a that slidably engages a track 100 as shown in FIG. 7B so that it can slide up and down and engage a fabric hook 104 as shown in FIG. 7E. Thus in this embodiment using a hook 102 and a sliding element 102a the hook can be moved/slide in any position along the longitudinal side of the mat and engaged with corresponding fabric loop 104 again to configure the mat in a desired position or configuration for use as described herein.

Figure 8A:
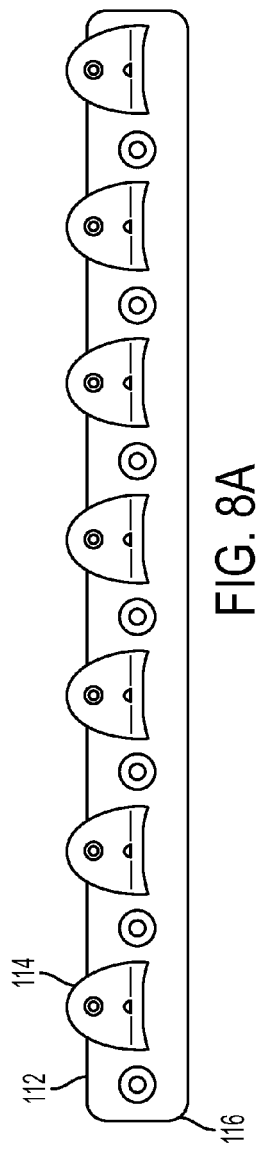
FIG. 8A shows a side elevational view of the mat and alternate embodiment fasteners schematically used in the present invention.
Figure 8B:
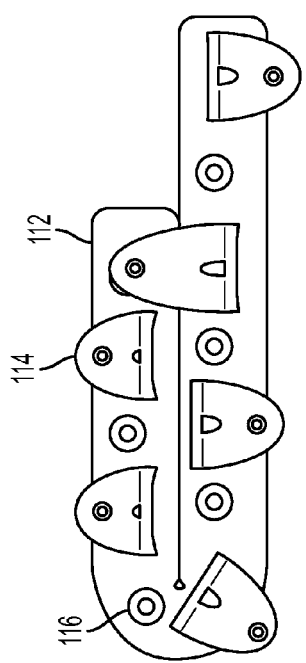
FIG. 8B shows a side elevational view of the mat shown in FIG. 8A partially folded and fastened.
Figure 8C:
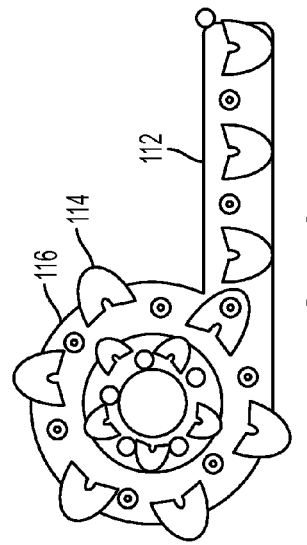
FIG. 8C shows a side elevational view of the mat shown in FIG. 8A having one end rolled up and fastened.
Figure 8D:
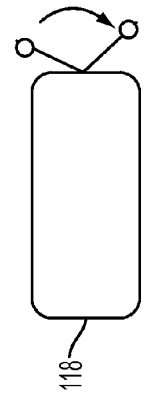
FIG. 8D shows a schematic diagram of a flap used in the alternate embodiment.
Figure 9:
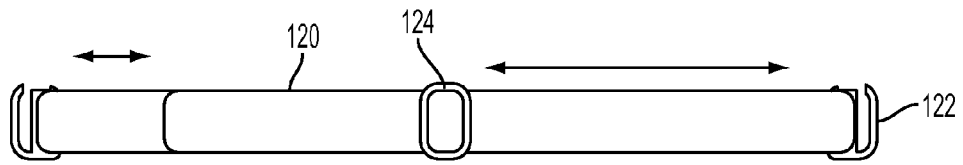
FIG. 9 shows a front elevational view of a back strap.
Figure 10:
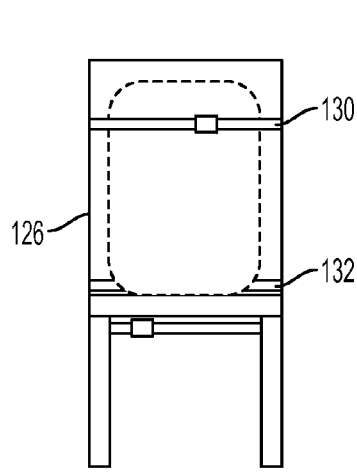
FIG. 10 shows a front elevational view of a chair using a back strap.
Figure 11:
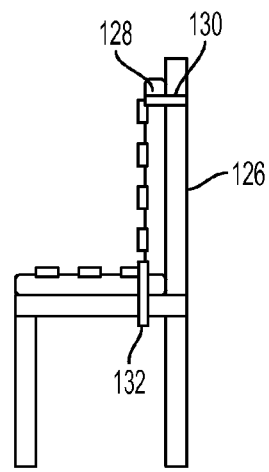
FIG. 11 shows a side elevation of a chair schematically with the present invention and a back strap.

FIG. 8A shows yet another alternate embodiment of different types of fasteners that can be used with the present invention. The mat 112 includes a semicircular flap 114 that contains a snap that can go upwardly or downwardly to engage a female fastener 116. The flap with a male snap on each side can be hooked up or down to a female snap as shown in FIG. 8B. FIG. 8C shows one end of mat 112 rolled up and held in position by the use of flaps having a male snap fastener that the and can be engaged to a female fastener to hold the rolled up portion in place. FIG. 8D shows a schematic diagram of a flap 118 used in the alternate embodiment. Referring now to FIG. 9, a back strap to hold the mat on the chair back or other position is shown that includes a strap 120 having a buckle 124 and additional connecting buckles 122. FIG. 10 and FIG. 11 show a chair schematically with straps 130 and 132 that can hold the mat 128 in place against the chair back or chair seat.

Figure 12:
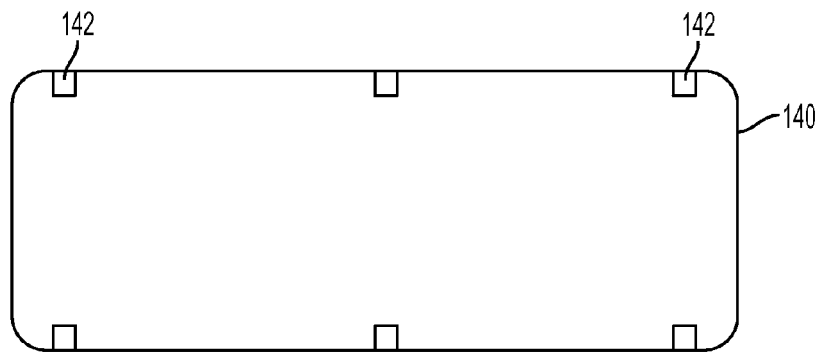
FIG. 12 shows a bottom plan view schematically of the mat having nonskid material on the bottom side.

FIG. 12 shows schematically the bottom surface of the mat 140. A non-skid material 142 on the bottom side is used to prevent the mat from sliding easily if used as a yoga mat or training mat on a floor so that the mat 140 would not slide around with movement on top of the mat.

Figure 13:
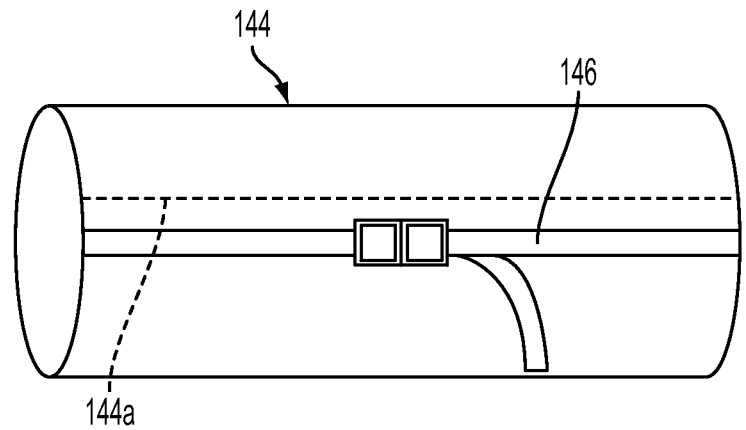
FIG. 13 shows a schematic perspective view of the mat rolled up within an overlapped pouch which is a bag to hold the mat while the bag is rolled up. The mat has an adjustable strap that can be used as a handle.

FIG. 13 shows a rolled up mat 144 that is inside an overlapped pouch that uses a bag to hold the mat while the mat in a rolled up configuration. A zipper pocket 144a may be used to carry small items such as passports or magazines. An adjustable strap 146 can be used as a handle or as a shoulder strap or to hook the mat on a suitcase.

Figure 14:
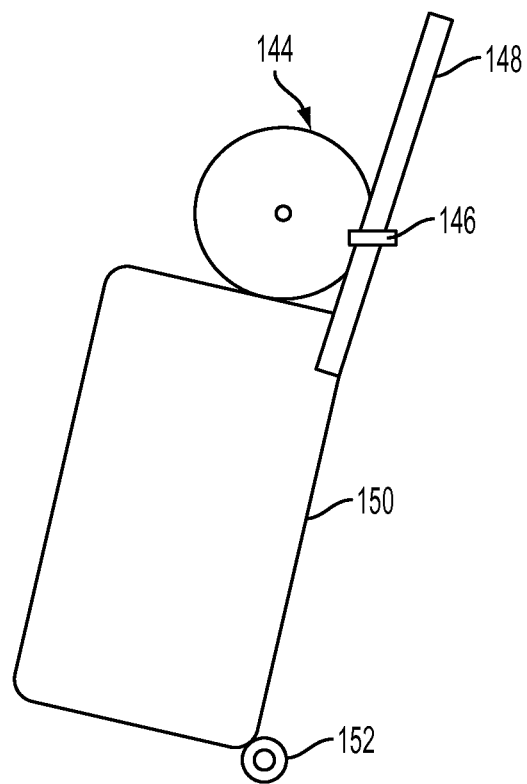
FIG. 14 shows the rolled up mat in a perspective side elevational view schematically as the mat could be mounted on a suitcase with wheels using the adjustable strap.

FIG. 14 shows the rolled up mat 144 mounted on top of a suitcase 150 that has wheels 152. The mat 144 is attached to a handle 148 on the suitcase 150 by the shoulder strap 146.

Because of the unique structural configuration and proportions of the mat in that the foam body and cloth cover are very pliable and lightweight, the mat is easily folded and rolled. The fastening tabs and fasteners along each longitudinal edge of the mat along with its fasteners and tabs can be manually folded into a large number of different individual configurations to achieve maximum comfort for the user especially when traveling. The mat can accommodate providing comfort to various and different areas of the body depending on the environment the traveler is in.

The mat can of course be used on a flat hard surface or on top of a bed surface and again folded accordingly to provide cushion areas, pillow areas or other configurations to support different portions of the human body in a prone or lying down condition.

Because of its light weight, the mat can be easily rolled up with fasteners and carried using a shoulder strap or carried by hand when traveling. Because of its construction, the mat is easily folded up into a very small unit for travel that includes foam compression for compactness. In one embodiment the travel mat could be 17 inches wide, 37-50 inches long and 1-1.5 inches thick as representative dimensions.

The travel mat shown herein with its fasteners and multiple configurations has been displayed in its desirable operating environment. Certainly other configurations are available that would be also useful for providing comfort to the user especially when traveling.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A portable comfortable mat that can be manually configured into multiple configurations for forming cushions and pillows of different shapes especially useful for vehicle seats including aircraft for travel, said mat manipulable and formable manually into a desired shape by rolling, bending, folding accordion or any other manipulation of the mat and said mat having fasteners that can be fastened to position said mat in a specific desired shape for individual comfort comprising:

foam pad whose length greatly exceeds its thickness;
fabric pad cover enclosing said foam pad;
said foam pad cover including a first longitudinal side and a second longitudinal side;
first fastening elements connected to said pad cover on said first longitudinal side and said second longitudinal side;
second fastening elements that can be individually removably attached to one or more of said first fastening elements and attached at strategic locations to said pad cover relative to said first fastener elements for removably connecting individual first fastening elements to individual second fastening elements in order to engage said pad cover along different folded portions of the longitudinal sides of said pad cover resulting in a specific configuration for the overall mat.

2. A portable mat as in claim 1 including:
said first fastening elements include identical individual fastening elements disposed along the longitudinal sides of said pad cover; and
said second fastening elements include one or more tabs, each tab having at least one or more second fasteners that can be connected to each of said first fastening elements such that each tab can be manually connected from one area of the longitudinal side of said pad cover to different areas along the longitudinal side of said pad cover.

3. A portable comfortable mat that can be manually configured into multiple configurations for forming cushions and pillows especially useful for vehicle seats including aircraft for travel and can be manipulated and formed into the comfortable mode by rolling, bending, folding accordion or any other manipulation of the material and can be fastened in position for individual comfort comprising:

rectangular foam pad whose length greatly exceeds its thickness;
fabric pad cover enclosing said foam pad;
said foam pad cover including a first longitudinal side and a second longitudinal side;
first fastening elements connected to said pad cover on said first longitudinal side and said second longitudinal side;
second fastening elements that can be removably attached to said first fastening elements for connecting individual first fastening elements to individual second fastening elements in order to engage said pad cover along different folded portions of the longitudinal sides of said pad cover resulting in a specific configuration for the overall mat;
said first fastening elements are buttons attached along the first and second longitudinal sides of said pad cover;
said second fastening elements include one or more elastic cords connected along the first and second longitudinal sides of said pad cover and sized in length to form loops to engage the buttons forming said first fastening elements so that the mat can be configured into multiple different shapes and sizes to provide pillows and cushions from different mat configurations.

4. A portable comfortable soft resilient pad that can be manually configured into multiple configurations for forming head rests, cushions and pillows of different shapes especially useful for vehicle seats including aircraft for travel, said pad manipulable and formable manually into a desired shape by rolling, bending, folding accordion or any other manipulation of the pad and said pad having fasteners that can be fastened in a specific desired pad shape for individual comfort comprising:

soft pad whose length exceeds its thickness;
said pad having a top longitudinal surface and a longitudinal bottom surface defined by the length and width of said pad;
first fastening elements attached to said pad on said longitudinal top surface and said longitudinal bottom surface;
second fastening elements attached to said pad longitudinal top surface and said pad longitudinal bottom surface that can be removably connected to said first fastening elements and for connecting individual first fastening elements to individual second fastening elements in order to engage said pad along different folded portions of the longitudinal top and bottom surfaces of said pad resulting in a specific configuration for the overall pad.

5. A device as in claim 4, wherein:
said first fasteners are hook fasteners and said second fasteners are pile fasteners.

6. A device as in claim 4, wherein:
said first and second fasteners are alternatively attached to said pad relative to each other.

* * * * *